Oct. 12, 1971          M. W. MUELLER          3,611,711
                       TURBOCHARGER CONTROL

Filed Nov. 6, 1969                    3 Sheets-Sheet 1

INVENTOR.
MILTON W. MUELLER
BY
                                      ATTORNEYS

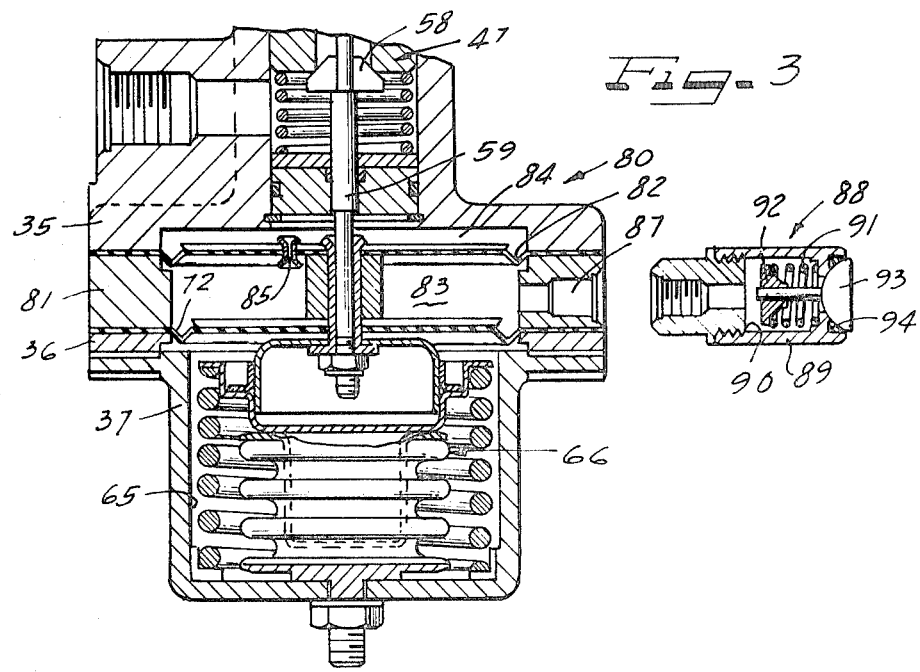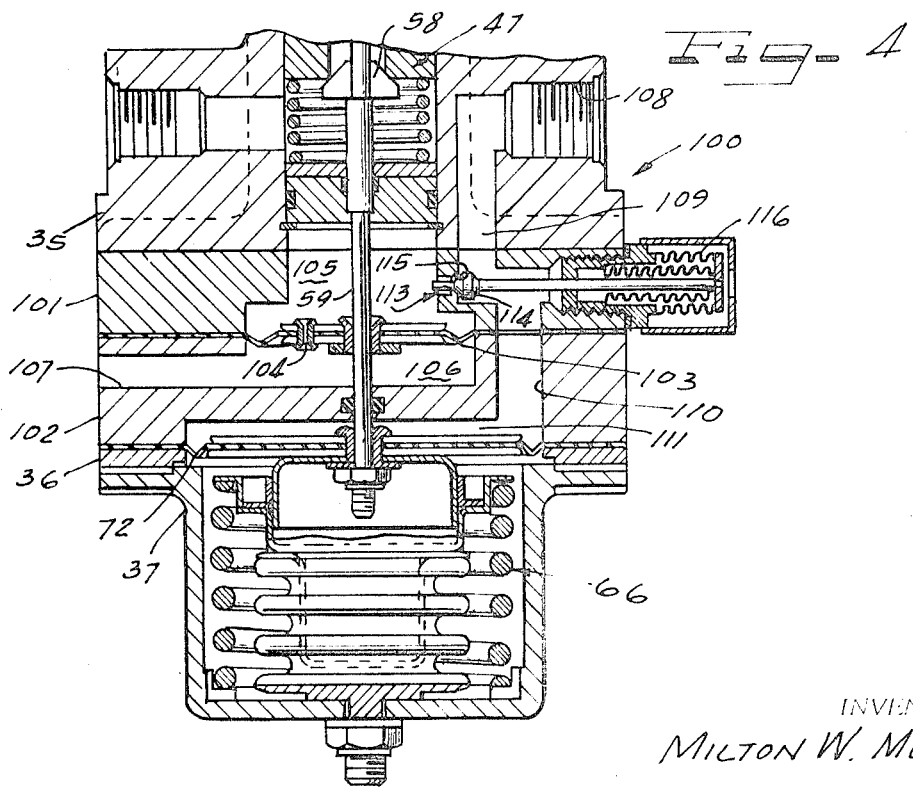

United States Patent Office 3,611,711
Patented Oct. 12, 1971

3,611,711
TURBOCHARGER CONTROL
Milton W. Mueller, Cleveland, Ohio, assignor to
TRW Inc., Cleveland, Ohio
Filed Nov. 6, 1969, Ser. No. 874,496
Int. Cl. F02b 37/00
U.S. Cl. 60—13                                     11 Claims

ABSTRACT OF THE DISCLOSURE

A control unit which is particularly useful in controlling the output pressure of a turbocharger in response to the manifold pressure with compensation for pressure drop at the throttle characterized by a reference unit disposed in the housing for the manifold pressure to act on and at least one diaphragm extending across said housing to apply the pressure differential between the manifold pressure and the output pressure of the turbocharger. In one embodiment, the reference unit includes a bellows of a predetermined volume of gas which schedules the displacement of the reference unit in response to the temperatures of the gases of the manifold. Another embodiment includes an additional diaphragm and valve means for applying additional pressures to the reference means to compensate for the altitude for the system to prevent overspeeding of the turbocharger.

BACKGROUND OF THE INVENTION

Field of the invention

The present invention is directed to a control unit responsive to a fluid pressure and in particular a control unit and method of controlling for a turbocharger system.

Prior art

In the fluid handling art and in particularly in systems such as a turbocharger system which supplies air at a pressure for an engine such as an airplane engine, the output of the turbocharger must be controlled in response to the required manifold pressure and preferably must be adjusted for the altitude of the aircraft and for the density of the gases being provided by the turbocharger. Present systems accomplish this by the pilot or airplane personnel manually making adjustments in response to indication sensed from various points in the turbocharger system to control the speed of the turbocharger. Automatic control systems have been proposed which include a series of sensing units measuring pressure at various points in the system against their respective reference unit with the output of each of the sensing units being interconnected to provide an ultimate summation of their signal to the control circuit. Such systems require extensive mechanical linkages between the various sensing units and extensive adjustments of the various reference units to obtain the desired control for the turbocharger systems.

SUMMARY OF THE INVENTION

The present invention overcomes the difficulties of prior proposed methods of controlling the speed of turbocharger by providing a single unit capable of the sensing pressures in a line in more than one place and provides a single output signal for use in controlling the source of power for the turbocharger. One embodiment includes means which makes adjustments for the altitude of the aircraft to prevent the turbocharger from being damaged by excessive speeds. In another embodiment, temperature sensing means are included in the unit to adjust the single output in response to the temperature of the fluids being measured.

Accordingly, it is an object of the present invention to provide a method of controlling and a simplified control unit providing a single output signal in response to pressure conditions taken from two points of a fluid passageway.

Another object of the present invention is to provide a method of controlling and a control unit providing a single output signal in response to measurements of pressures from two points in a system with the signal being adjusted for changes of temperature of the system.

A still further object of the present invention is to provide a method of controlling and a control unit capable of providing a control signal in response to the pressures from various points in a control system with compensation for the altitude of the aircraft using the system.

Other objects, features and advantages of the invention will be readily apparent from the following description of the preferred embodiments thereof taken in conjunction with the accompanying drawings although variations and modifications may be effected without departing from the spirit and scope of the novel concept of this disclosure.

BRIEF DESCRIPTION OF THE DRAWINGS

FIG. 3 is a partial cross-section with parts in elevation similar to FIG. 2 of an embodiment of the control device of the present invention; and FIG. 4 is a partial cross-section with parts in elevation of another embodiment of a control device of the present invention.

DESCRIPTION OF THE PREFERRED EMBODIMENT

Figure 1:
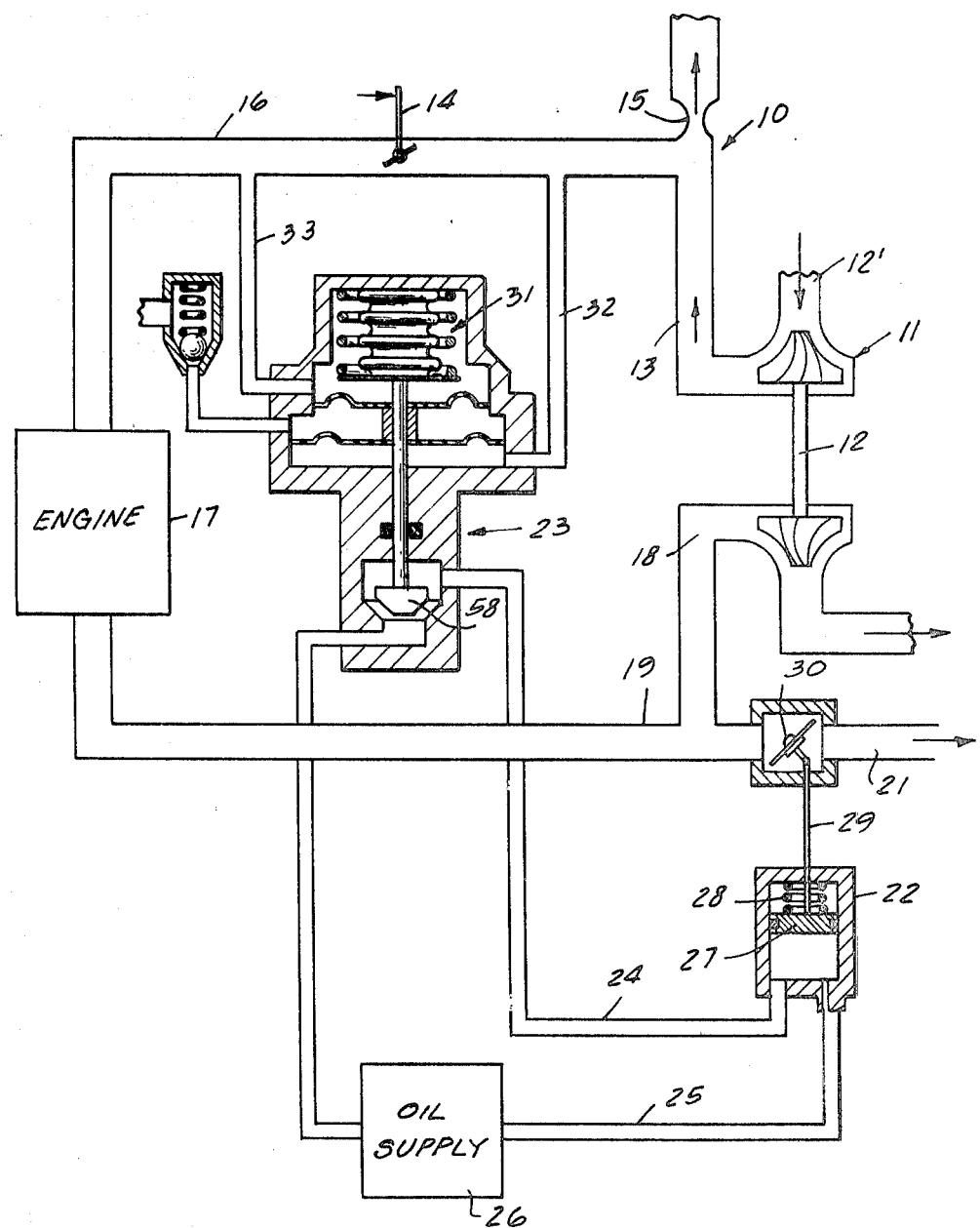
FIG. 1 is a diagrammatic illustration of a turbocharger control system utilizing a control device and method of the present invention.

Although the principles of the present invention are of utility in a control unit used in application where the pressures taken from at least two points of a fluid passageway are necessary for the proper control of the fluid therein, the principles are particularly useful when incorporated in a control unit for a turbocharger system which is diagrammatically illustrated in FIG. 1 and generally indicated at 10.

A turbocharger system 10 comprises a turbocharger 11 having a rotor 12, an intake 12' and an output 13 which supplies input pressure of air to a throttle 14 and as illustrated supplies air through a restriction 15 to a conduit leading to the cabin of an aircraft. The air passing through the throttle 14 enters a manifold 16 of an engine 17. To drive the turbochrager 11, a drive source or power supply is supplied by conduit 18 to the turbocharger 11. As illustrated, the supply 18 is connected to the exhaust 19 of the engine 17. To vary the amount of the supply, a valve means such as a wastegate 20 which is illustrated to be a butterfly valve can be opened to by-pass a portion of the exhaust in the pipe 19 out an exhaust bypass pipe 21. To actuate the butterfly valve means 20, a hydraulic actuator 22 connected to a control means 23 by conduits 24, 25 and an oil supply 26.

The hydraulic actuator 22 comprises a single acting piston 27 acting against a spring 28 and having a rod 29 connected to the valve member 30 of the valve means 20. Fluid acting on the piston 27 forces the valve member 30 to a closed position. By controlling the amount of fluid bled from the piston chamber through the conduit 24, the control unit 23 can adjust the position of the piston 27 resulting in positioning the valve member 30 in any desired position to allow any amount of by-passing of the gases of the engine exhaust line 19 and then reduce the exhaust gases driving the rotor 12 of the turbocharger 11.

The pressure in the output 13 of the turbocharger 11 is dependent upon the speed of the rotor 12 of the turbocharger and on the pressure of the intake 12' of the turbocharger. Since the intake pressure 12' is not always constant for example in aircraft applications it varies with the altitude and the speed of the aircraft, the only effective means of varying or controlling the output pressure in the passageway 13 is by controlling the speed of the rotor 12 of the turbocharger 11. If the input pressure were constant, a decrease in the speed of the rotor 12 will decrease the pressure in the output passageway 13 and an increase in rotor speed will increase the output pressure. If a constant output pressure is desired, the speed of the rotor 12 must be varied to compensate for variations in the head of the intake 12' of the turbine.

Since the operation of the engine 17 is dependent upon the manifold pressure 16, the supply of fluid to the manifold must be controlled to maintain the pressure in the manifold 16 at the desired level. As illustrated in FIG. 1, the control unit 23 has a pressure responsive reference means generally indicated at 31. If the pressure in the output passageway 13 were directly applied by a conduit 32 to the reference means 31, the pressure in the output 13 of the turbocharger would be sensed. However, the control unit 23 would not compensate for changes in the demands in the manifold pressure 16 in response to the settings of the throttle 14. One disadvantage with such a system would be the applying of a tremendous pressure on the throttle 14 which is not required.

Figure 2:
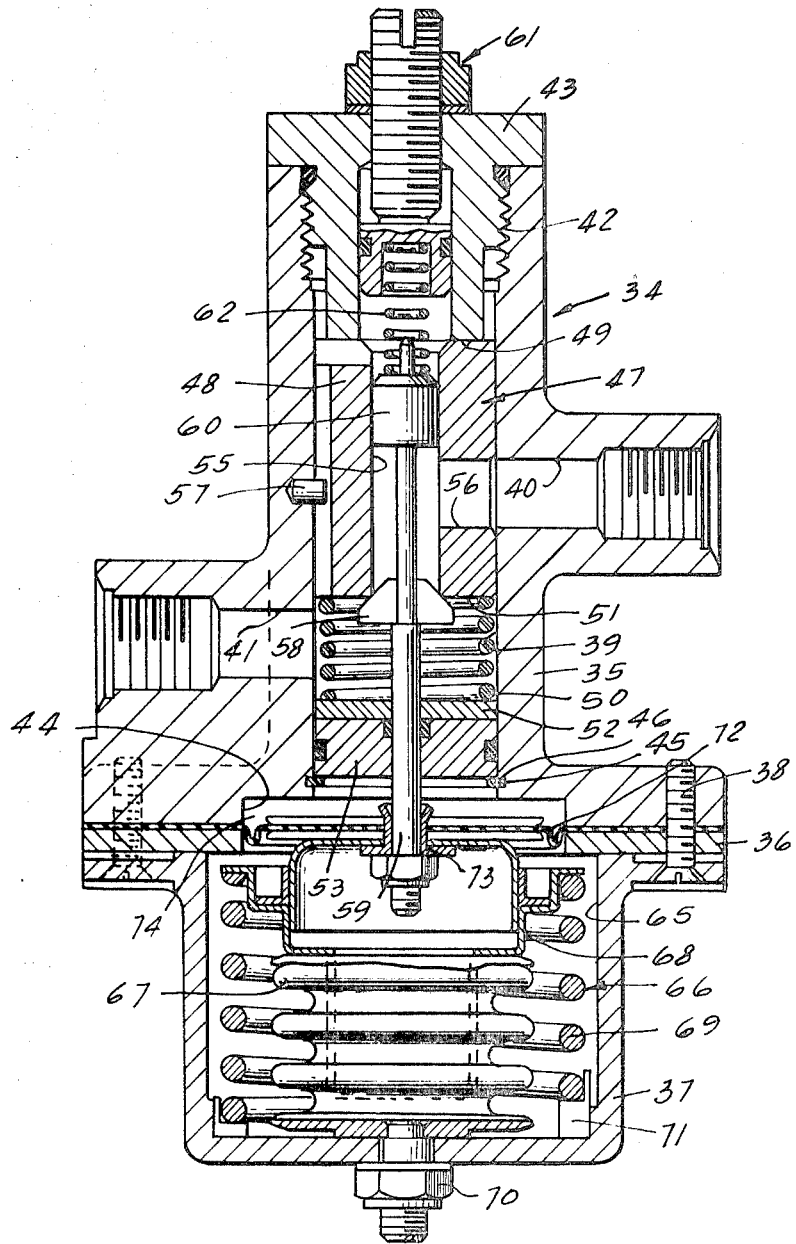
FIG. 2 is a longitudinal cross-section with parts in elevation of the control device used in the present invention.

Another possibility would be to sense the pressure of the manifold 16 by use of a conduit such as 33 which would directly apply the pressure against the reference means 31. Such a system would be ideal if the throttle 14 were completely open so that there would be no pressure drop or substantially little pressure drop thereacross. However, when there is a substantial pressure drop and when the reference means 31 is set to open the control circuit at a predetermined pressure, the turbocharger 11 is trying to create the desired pressure. By trying to increase the pressure in the manifold 16, the turbocharger 11 causes an undesirable back pressure on the engine 17 through the exhaust line 19. To overcome this disadvantage, the first embodiment of the present invention which is best illustrated in FIG. 2 provides a control unit generally indicated at 34.

The control unit or device 34 comprises a housing made up of housing portion 35, an annular ring 36, and a cup-like portion 37 which are held together by fastening means such as the screws 38 with appropriate seals being provided. The housing portion 35 has a cavity 39 with an inlet port 40 and an outlet port 41. The cavity 39, which is formed by a bore extending through the housing portion 35 has internal threads 42 at one end of the bore to threadedly receive an end cap 43, which closes one end of the bore to form the cavity. The bore forming the cavity 39 at the opposite end to the threads 42 is provided with a counterbore 44 and adjacent to the counterbore 44 with an annular groove 45 receiving a snap ring or retainer 46.

A valve assembly 47 is disposed in the cavity 39 and comprises a valve body 48, which is biased towards an end surface 49 of the cap 43 by a spring 50 acting between a surface 51 of the valve body 48 and a plate 52 which rests on a sealing plate 53 retained in the cavity 39 by the snap ring 46. The sealing plate 53 has appropriate sealing means to provide a fluid tight closure of the cavity 39 adjacent the snap ring 46.

The valve body 48 has an axial passageway 55 which is in communication with a radially extending passageway 56. Key means 57, comprising a pin and groove acting between the wall of the cavity 39 and the valve body 48, maintains the passageway 56 in alignment with the inlet port 40. The passageway 55 terminates with the lower surface 51 to form a valve seat for a valve member 58 which is carried on the valve shaft or stem 59 which extends out of the cavity through axial openings in the plates 52 and 53.

In order to minimize the effect of the fluid passing through the valve assembly 47, the valve stem 59 supports a piston 60 which is slidably received in the bore 55 and is axially spaced from the valve member 58. Thus fluid entering the bore 55 applies an upward force on the piston 60 which counteracts the force tending to force the valve member 58 away from the valve seat.

The cap 43 contains an adjustment means generally indicated at 61 which supplies an adjusting force by varying the spring pressure of a spring 62 acting on the pistons 60. The spring 62 biases the valve member 58 toward an open position. Each of the parts of the adjustment means 61 includes appropriate seals and a lock nut means to hold the adjustment unit 61 in the desired position. The valve assembly 47 is effectively a servo valve means or assembly which responds to movement of the valve stem 59 to control the flow of fluid through the inlet port 40 to the outlet port 41.

Referring to FIG. 1, the position of the valve member 58 will control the flow of fluid in the lines 24 back to the oil supply or the reservoir of the oil supply 26. Since the oil supply to the actuator 22 is supplied at a constant pressure, the bleeding off through the line or exhaust 24 will enable the piston 27 to assume a predetermined equilibrium position in the cylinder with the pressure acting on the piston balanced by the force of spring 28. By increasing the amount of flow through line or conduit 24, the spring 28 will force the piston towards the ports which causes the valve member 30 of the wastegate valve to move toward an open position. By reducing the flow through the valve assembly 47 by moving the valve member 58 against its seat, the pressure acting on the piston will increase and cause it to be moved against the spring 28 to force the valve member 30 towards the closed position.

The control unit 34 as illustrated in FIG. 2, includes a pressure sensing device which ultimately controls the position of the valve member 58 to control the amount of fluid passing through the servo valve assembly 47. To provide chambers for the various fluid pressures to act on the sensing means, the housing portion 37 has a cavity 65 in which a pressure responsive reference means indicated at 66 is disposed. The reference means 66, which is similar to reference 31, includes a bellows 67, a bellows plate 68 attached to the bellows and a bellows spring 69 acting on the plate 68 to bias the bellows to an extended position. Reference means 66 which is mounted in the cavity 65 in a fixed position by suitable means such as a bolt or screw arrangement 70, also includes a spring base plate or ring 71 which can be of different sizes or can be shimmed to change the spring force of the spring 69.

An extension of the valve stem 58 which extends through the bores or the openings of the plates 52 and 53 is connected to a portion of the bellows plate 68 and acts as a linkage to transfer movement of the reference means 66 to the valve member 58.

As mentioned above, it is desirable to apply the pressure of the manifold against the reference means 66 and to apply the pressure differential between the manifold pressure and the output pressure of the turbocharger against the reference means. This is accomplished by providing a diaphragm 72 which is rigidly connected to the shaft or stem 59 or as illustrated is rigidly attached by an expanded rivet means 73 to a portion of the bellows plate 68. The diaphragm 72 seals the cavity 65 to form a first pressure chamber and coacts with the counterbore 44 of the portion 35 to form a second pressure chamber 74. Suitable port means are provided in the body portions for supplying a fluid pressure to each of the fluid pressure chambers 74 and 65.

In operation, the displacement of the reference means 66 positions the valve member 58 via the linkage of the stem 59 with respect to the valve seat of the servo valve assembly 47. The reference means 66 is displaced when the force developed by the fluid pressure exceeds a predetermined force value or set point which is dependent on the spring force of the bellow spring 69 minus the spring force of the spring 62 of the adjustment means. If both of the pressures in the chambers 65 and 74 are equal which would occur when the pressure drop across the throttle 14 is negligible, the force acting on the reference means 66 would be the pressure in the chamber 65 times the area that it is acting on which is the bellows area. When the pressure or force developed by the pressure in the chamber 65 exceeds the predetermined value or set point, the reference means 66 will be displaced and move the valve member 58 from its seat. The amount of displacement of the reference means 66 and therefore the valve member 58 will be proportional to the force developed by the pressure in the chamber 65 exceeding the predetermined value.

Since the throttle 14 may be in the setting which causes a pressure drop thereacross, the pressure acting in the chamber 74 which is the pressure at the output 13 of the turbocharger 11 is greater than the manifold pressure 16 which is applied to the chamber 65. The result is that the diaphragm 72 will be flexed by the pressure differential of the two pressures acting on its sides, and the pressure differential will be applied against the reference means 66 along with the pressure in the chamber 65 being applied thereto. The force developed by the pressure differential applied to the diaphragm is dependent upon the area of the diaphragm which is larger than the bellows area and the amount of the pressure drop across the throttle 14. The application of the sum of the forces caused by the pressure differential and the pressure acting on the bellows cause displacement of the reference means at a lower manifold pressure and reduces the speed of the rotor 12 of the turbocharger 11.

Since the area of diaphragm 72 is larger than the bellows area, the sum of the forces acting on the reference means is greater than if the output pressure of passage 13 were directly applied to the bellows 67. Therefore, the control device 34 has effectively adjusted the set point for the reference means 66 in response to the change in the pressure drop across the throttle 14. Thus, the control device 34 is automatically scheduled for variation in the throttle setting, which scheduling is desirable.

As mentioned above, with the displacement of the reference means 66, the valve member 58 is moved off of the valve seat to allow fluid flow through the servo control 47 which flow varies the pressure applied to the piston 27 to cause it to assume a new position in its cylinder with the result of positioning the valve member 30 of the wastegate valve to a new position causing a change in the exhaust pressures applied to the turbocharger 11. To prevent the hunting or overcorrection for the changes in the sum of the forces created by the pressures, characteristic lags can be engineered into the control system which tends to smooth the operation to prevent overcorrecting of the control circuit for a pressure change. Such lags are a question of design which are within the ordinary skill of the design engineer.

In the discussion, the bellows 67 was considered to be an evacuated member with only a dampening fluid applied therein. Thus the heating or temperature of the bellows 67 does not substantially effect the amount of force necessary to cause displacement of the reference means 66. In certain applications such as an aircraft, the density of the fluid or gases being supplied to the manifold 14 is a critical requirement. For example, during a very hot day on a hot runway, the output of the turbocharger 11 can be at a maximum; however, the density of the gases due to their temperature is such that maximum power production for the engine 17 is not occurring. To compensate for the density of the fluids such as the gases being provided by the turbocharger, it is desirable to provide means in the control system which will compensate for the density of the gases.

Since the density of the air is related to its temperature, a provision of a bellows 67 charged with a predetermined volume of gas at a predetermined pressure and temperature can be utilized. By providing the bellows 67 which has this predetermined mass of gas, the bellows is sensitive to the temperature of the air in the chamber 65. For example, with a high temperature in the air in chamber 65, the pressure in the bellows due to the increase of temperature will increase and effectively vary the predetermined value or set point in response to changes in the temperature. With the bellows filled with the gas charge at a known temperature and pressure, the reference means 66 will include means sensitive to the temperature, which means will adjust the predetermined value for displacement in responsee to increases and decreases of the temperature. Thus, when the aircraft using such a system is operating in a hot ambient temperature, the control system will compensate for the loss of density in the gases by providing a higher pressure than a system which does not have the temperature sensitive means.

The control unit 34 provides a single error signal for the servo valve unit 47 by considering the pressure in the manifold 16, the output pressure of the turbocharger 11, and the density of the gases being supplied by the turbocharger. However, in an aircraft application at high altitudes, the lower density of the air due to the altitude requires higher speed for the turbocharger to maintain the predetermined pressures. Such speed can have the detrimental effect upon the turbocharger 11 in an attempt of the turbocharger's rotor 12 to effectively run away. A second problem is due to the rarification of the air at a high altitude resulting in a reduction of cooling of the units causing the engine to overheat. In order to compensate for these problems, means must be provided to prevent the rotor 12 from exceeding a maximum speed. To prevent the speed of the rotor from exceeding a certain limit, the control device should include means to schedule the device for the altitude of operation by reducing the set point of the reference means 66. A control unit generally indicated at 80 in FIG. 3 is an embodiment of the control unit provided with means to compensate for altitude changes.

The control unit 80 having a servo valve assembly 47 which is the same as that of the previously described embodiment of FIG. 2, has an additional annular body portion or ring 81 disposed between the annular ring 36 and the body portion 35. The diaphragm 72 is disposed between the annular rings 81 and 36 and a second diaphragm 82, which is operably coupled to stem 59, is disposed between annular rings 81 and housing portion 35. With the positioning of the diaphragms 72 and 82, three pressure chambers 65, 83 and 84 are formed. As in the previously described embodiment the pressure chamber 65 is substantially the same and is formed by the cavity 65 and the diaphragm 72. The pressure chambers 84 and 83 are in communication with each other by a restricted orifice 85 in the diaphragm 82 which orifice enables the pressure of chamber 84 to leak into chamber 83. Ports (not illustrated) are provided for applying a fluid under pressure to the chambers 65 and 84 while the chamber 83 has a port 87 in the annular ring 81 which port terminates in a check or relief valve means generally indicated at 88. The orifice 85 balances the pressure acting on diaphragm 82 except when there is flow through the orifice due to the opening of relief valve 88.

The check valve means 88 includes a housing portion 89 having a chamber 90 which contains a resilient means such as a spring 91 and a stem support means 92. A valve member 93 rests on a seat 94 and is normally biased to the closed position by the spring 91 and atmospheric pressure acting on the valve member 93. The relief valve means 88 opens to vent the chamber 83 as the pressure therein applies a force to the valve member 93 which exceeds the force of the spring 91 and the atmospheric pressure on the valve member 93. Thus, the chamber 83 is vented at a set point where the pressure differential between the pressure in the chamber and atmospheric pressure exceeds the spring force. By selection of the characteristic of the spring 91, the valve means 88 will open at a predetermined atmospheric pressure or altitude. If the valve means 88 were not provided, the unit would schedule the set point downward for an increased altitude starting at sea level.

In operation, at low altitudes the manifold pressure is applied via the ports to the chamber 65 to act on the reference means 66, the output pressure of the turbocharger 11 is applied via ports to the chamber 84 to act on the diaphragm 82. Assuming a constant pressure set-up, pressure in the chamber 83 will be substantially similar to that in chamber 84 so that the diaphragm 72 will respond as the diaphragm 72 in the previously explained embodiment to apply the pressure differential between the manifold pressure and the output pressure to the pressure responsive means 66. One advantage of the two-diaphragm setup is that the orifice 85 and the diaphragm 82 offers a resistance to any quick or substantial pressure changes in the output pressure of the turbocharger 11 causing a lag which smooths out the control function and is desirable.

When the airplane utilizing the system reaches a predetermined altitude, the pressure in the chamber 83 exceeds the force of the spring 91 and the atmospheric force acting on the valve member 93 causing the relief valve means 88 to open to vent the chamber 83. At that time, the pressure differential acting on the diaphragm 72 will equal the differential between the pressure in chamber 65 and the pressure in the chamber 83 which will be equal to that pressure necessary to open the relief valve 88. Since the chamber 83 has been vented, there will be a pressure differential between the pressure chamber 83 and the chamber 84 acting on the diaphragm 82.

As illustrated, the diaphragm 82 is of a larger diameter than the diaphragm 72 so that it will apply an additional force greater than the force applied by the diaphragm 72 to the reference means 66 to cause displacement of the reference means. As the altitude continues to increase, the pressure in the chamber 83 necessary to cause the relief valve to vent the chamber to the atmosphere will decrease so that the pressure in the chamber 83 will be the atmospheric pressure plus the spring pressure created by the spring 91. The net result is that the force caused by the pressure in the chamber 84 acting on the diaphragm 82 will increase as the altitude of the airplane increases to cause an increase in the additional force applied to the reference means 66 and therefore, the unit 80 is scheduled for an altitude above a predetermined altitude. The amount of reduction in the set point to reduce the speed of the rotor 12 is dependent on the ratio between the area of the diaphragm 82 and 72. Since the ratio must be larger to provide proper control at higher altitudes practical limitation on the size of diaphragm 82 limits the maximum altitude for which the unit 80 provides the proper control function.

In order to provide a control system which provides a proper control characteristic for the turbocharger at greater altitudes than that of the embodiment illustrated in FIG. 3, another embodiment generally indicated at 100 (FIG. 4) incorporating the servo control valve means 47 is provided. As in the peviously described embodiments, the control means or unit 100 has a housing made up of housing portions 35, ring 36 and housing portion 37 and utilizes the diaphragm 72. Additional housing portions 101 and 102 are placed between the annular ring portion 36 and the portions 35, and a diaphragm 103 which has a restricted orifice 104 and is coupled to stem 59, is disposed between the body portions 101 and 102.

Body portion 101 has a bore which coacts with a diaphragm 103 to form a chamber 105. The body portion 102 has a cavity which coacts with the diaphragm 103 to form a chamber 106 which is vented by a passageway 107 to the atmosphere. The housing portion 35 is provided with an inlet port 108 for receiving the gas from the outlet passageway 13 of the turbocharger 11. Portions 101 and 102 respectively are provided with passageways 109 and 110 respectively for conducting the pressure from the port 108 to a chamber 111 acting on one side of the diaphragm 72. Thus the diaphragm 72 functions as it functioned in the embodiment of FIG. 2.

The body portion 101 supports a valve means 113 including a valve member 114 cooperating with a valve seat 115. The valve means 113 provides a controlled communication between the passageway 109 and the chamber 105 and the valve means is actuated by the valve member 113 being connected to an actuating means including a bellows means 116 mounted on the outside of the ring portion 101.

The bellows means 116 senses the atmospheric pressures and at a predetermined atmospheric pressure begin to lift the valve member 114 from the valve seat 115. With the movement of valve member 114 from the valve seat 115, pressure in the passageway 109 enters the chamber 105 to act on one surface of the diaphragm 103 to add an additional force acting on the reference means 66 to cause the valve member 58 to be lifted from its seat in the servo valve means 47. Since the chamber 106 is vented to the atmosphere, the pressure in the chamber 105 is substantially unopposed and even a small diaphragm 103 can exert the necessary additional pressure to the reference means 66 to compensate for the increased altitude.

The valve member 114 is contoured with respect to the seat 115 so that as the displacement from the seat 115 increases the size of the opening increases. With the increase of the size of the opening of the valve means 113, more fluid bleeds into the chamber 105 to increase the pressure therein. Thus, as the altitude increases above the predetermined altitude, the pressure in the chamber 105 increases to increase the pressure differential acting on diaphragm 103 to increase the additional force being applied to the reference means 66. Since the pressure in the chamber 105 will increase with the increasing of the altitude due to the increased movement of the valve member 114 by the sensing means 116, the control unit 100 will provide the proper control function to prevent overspeeding of the rotor 12 of the turbocharger 11 for the ambient atmospheric conditions.

The bellows means 116 as illustrated includes a sealed evacuated double bellows which expands as the atmospheric pressure decreases. Other proper preloaded bellows arrangements which function in equivalent manner can be readily utilized.

In operation below the predetermined altitude, the valve means 113 is closed and the pressure in chambers 105 and 106 are substantially equal. Thus the control unit 100 will function in a manner similar to the unit 34. As the altitude set point is reached, the bellows means 116 moves the valve member 114 from the seat 115 to open the valve means 113 to enable fluid pressure in passage 109 to bleed into the chamber 105. Even though a portion of the fluid will bleed through the orifice 104, a pressure differential will be applied to the diaphragm 103 to exert the additional force on the reference means 66 to compensate for the atmospheric conditions. As the altitude increases the valve means 113 is opened further to increase the amount of fluid bled into chamber 105 to increase the pressure therein and increase the pressure differential on the diaphragm 103. Thus the reduction in the set point increases with an increase in the altitude.

Assuming operation above the predetermined altitude by an aircraft using the control unit 100, the pressure in the chamber 105 has applied a force acting on the reference means 66. With a decrease in the altitude, the valve means 113 reduces the amount of fluid flowing into the chamber 105; however, the orifice 104 will continue to bleed pressure from the chamber 105 to cause the pressure therein to be reduced. As the altitude is decreased below the predetermined level or point, the valve means 113 is closed and the chamber 105 will lose its pressure through the orifice 104 until the pressure acting on the diaphragm 103 is balanced.

The control unit 100 provides the proper control function to maintain the desired control of the turbocharger 11. Due to the arrangement of the pressure chamber and diaphragm, the control unit 100 can provide proper control function for higher altitudes than the control unit 80 which has a practical altitude limit due to the ratio of the size of its diaphragms.

The reference means 66 utilizes either an evacuated bellows which would not be responsive to temperature changes in the fluid or gases in the chamber 65 or it can utilize a gas charged bellows which is temperature responsive. By using a temperature responsive bellows in the reference means 66, the control units 80 and 100 can include a scheduling function for the density of the gases in the manifold 16.

As illustrated in FIG. 1, the output of the turbocharger 11 also provides pressure for the cabin of the aircraft. Thus it is essential that the pressure in the output passageway 13 is not greater than necessary at low throttle or part throttle operations since the excess pressure of the output of the turbocharger 11 would cause an unbearable condition upon the occupants of the cabin. As illustrated, the outlet 15 going to the cabin includes a restriction which helps reduce the pressure being applied to the cabin and by properly selecting the size of the restriction and the size of the conduit 32, the necessary pressure in the cabin will always be maintained without being adversely affected by the engine operation and the operation of the control unit such as 34.

Each embodiment of the control unit of the system prevents overspeeding of the rotor 12 of a turbocharger 11 and prevents the decompression of the cabin at part throttle operations or during changes in the throttle setting. Each control unit also prevents inefficient back pressure on the engine exhaust at partially closed throttle setting. All of the controlling features are accomplished by a single unit using a single reference and therefore eliminate the problems of the prior art controllers such as a system using multiple units which requires mechanical linkages between the units.

I claim as my invention:

1. A control device for a system for controlling the output pressure of a turbocharger in response to a manifold pressure of the engine being supplied by the turbocharger by varying the amount of the power source applied to the turbocharger, said control device comprising a housing having a cavity; a pressure responsive reference means disposed in said cavity, said reference means being displaceable at a predetermined value of force applied thereagainst; means connected to said reference means and extending out of said cavity to actuate a control means in response to displacement of said reference means to control the amount of power source to the turbocharger, diaphragm means operatively connected to said reference means and extending across said cavity to provide a pair of chambers, means applying manifold pressure of the manifold to one of said chambers to act on said reference means and means applying the output pressure of the turbocharger to the second of said cavities, whereby said reference means is acted on by the manifold pressure and a pressure differential between said manifold pressure and the output pressure to create a proportional signal in response to the amount of displacement of said reference means.

2. A control device according to claim 1 wherein said reference means includes a bellows means and a spring means, said bellows means being filled with a predetermined volume of gas at a predetermined temperature and pressure, whereby said gas of said bellows means changes in pressure in response to changes in temperature of the fluid in said first chamber to adjust the predetermined value of said reference means in response to changes in the temperature of the fluid in the manifold.

3. A control unit for controlling the output pressure of a turbocharger in response to a manifold pressure of an engine supplied by said turbocharger by controlling the power source to drive the turbocharger, said unit comprising a housing having a first and second cavities, said first cavity having a fluid inlet and an outlet extending in communication therewith, a fluid valve assembly disposed in said first cavity; a reference means displaceable in response to a predetermined value of pressure applied thereagainst disposed in said second cavity, means interconnecting said reference means and the valve member of said valve assembly, a diaphragm means disposed across said second cavity and coupled to said reference means, said diaphragm means dividing said second cavity into a first and second chamber, means for applying fluid pressure from said manifold to said first chamber to act directly on said reference means and on one side of said diaphragm means, and means to apply the output pressure of said turbocharger to said second chamber to act on the other side of said diaphragm whereby said reference means is displaced when said manifold pressure and the differential between the output pressure and manifold pressure exceeds a predetermined amount and said displacement is corresponding to the amount of excess which positions the valve member a distance corresponding to the amount of excess to vary the amount of control fluid passing through said first cavity to vary the drive source to the turbocharger.

4. A control unit according to claim 3 which includes a second diaphragm disposed in said second chamber to form a third chamber between said diaphrgams, said second diaphragm having an orifice to enable bleeding of fluid between the second and third chambers, said housing having valve means venting said third chamber when the pressure differential between the third chamber and the outside of said housing exceeds a predetermined amount so that below the predetermined amount for the pressure differential, said diaphragms act to provide a pressure differential between said manifold pressure and said output pressure of said turbocharger and at said predetermined amount, said second diaphragm applies additional force to said reference means to cause displacement of said valve member at a lower predetermined value for the sum of the manifold pressure and the differential between the manifold and output pressure.

5. In a control unit according to claim 3 which includes a third cavity in said housing said third cavity being in free communication with the outside of said housing and having a diaphragm extending thereacross to form a third chamber, said diaphragm having a bleed orifice therethrough to vent the third chamber formed in said third cavity to the outside, pressure responsive valve means interconnecting the means for applying the output pressure to said second chamber and the third chamber, said pressure responsive valve means including an actuating unit responsive to the atmospheric pressure, said pressure responsive valve means being opened to interconnect the output pressure of said turbocharger to said third chamber to act on said diaphragm at a predetermined atmospheric pressure so that an additional force is applied to said reference means to cause the displacement thereof at a lower sum of the pressures in the manifold and output of the turbocharger to cause the valve assembly to reduce the power source to the turbocharger to prevent overspeeding thereof.

6. In a control unit in accordance with claim 3 wherein said reference means includes a bellows containing a predetermined amount of gas at a predetermined temperature, volume and pressure, said bellows being disposed in said second cavity to be heated to the temperature of the fluid in the first chamber, so that the pressure of the gas in the bellows is proportional to the temperature of the manifold fluid in the first chamber to increase and decrease the predetermined vaue of said reference means in response to increases and decreases of the temperature thereof.

7. A device for controlling the output pressure of a turbocharger in response to a manifold pressure of an engine being supplied by the turbocharger by varying the amount of the power source applied to the turbocharger, said device including a pressure responsive means providing a reference of a predetermined value and having a portion displaceable when a pressure of a predetermined value is applied thereto, control means regulating the amount of power source applied to said turbocharger, linkage means interconnecting said pressure responsive means and said control means; means for applying fluid pressure of the manifold against said pressure responsive means and means simultaneously applying the pressure differential between the output pressure of the turbocharger and the manifold pressure against said pressure responsive means so that the control means receives a proportional signal from the pressure responsive unit when the sum of the manifold pressure and the pressure differential exceeds a predetermined amount with said signal being proportional to the amount of excess.

8. In a method of controlling the output pressure of a turbocharger in response to the manifold pressure of an engine associated with the turbocharger by controlling the power source for the turbocharger, the improvement comprising the steps of simultaneously applying the manifold pressure and a pressure differential between the output pressure and the manifold pressure against a pressure sensitive reference means, generating an error signal as a sum of the manifold pressure and pressure differential exceeds a predetermined value of said reference means, said error signal being proportional to the excess of the sum over the predetermined value, utilizing the error signal to vary the amount of the power source supplied to the turbocharger so that the speed of the turbocharger is varied in response to the error signal in an amount proportional to the amount of the error signal to vary the output pressure of the turbocharger.

9. In a method according to claim 8 which includes the step of compensating in the error signal for variation in the temperature of the gas in the manifold.

10. In a method according to claim 8 which further includes the steps of sensing the atmospheric pressure, and applying additional pressure to the pressure responsive reference means as the atmospheric pressure drops below a predetermined value, said additional pressure being applied along with the sum of the manifold pressure and the pressure differential, whereby an error signal for reducing the speed of the turbocharger is produced for a lower value of the sum of the manifold pressure and pressure differential and prevents overspeeding of the turbocharger as the atmospheric pressure is decreased below a predetermined value.

11. A device for generating a signal in response to a pressure of a fluid taken from at least two different points of a fluid passageway extending from a turbocharger to an intake manifold of an engine, comprising reference means displaceable in response to a force applied thereto; means for applying a fluid pressure from the engine manifold to said reference means to create a first force acting thereon; means for attaining a pressure differential between the fluid pressure taken from said engine manifold and a second point taken at an output of the turbocharger and applying said pressure differential to said reference means to create a differential force acting on said reference means simultaneously with said first force; and means coupled to said reference means for transmitting the amount of displacement of the reference means is proportional to the sum of the first force and differential force to a control system for controlling a power source of the turbocharger so that as the sum of first force and differential force increases, the power source to the turbocharger is decreased to cause a corresponding decrease in the output of the turbocharger.

References Cited

UNITED STATES PATENTS

| | | | |
|---|---|---|---|
| 2,567,486 | 9/1957 | Johansson | 60—13 |
| 2,878,797 | 3/1959 | Madden | 60—13 X |
| 2,896,598 | 6/1966 | Reggio | 123—119 CE |
| 3,035,408 | 5/1962 | Silver | 60—13 |
| 3,096,614 | 7/1963 | Silver et al. | 60—13 |
| 3,104,520 | 9/1963 | Cazier et al. | 60—13 |
| 3,195,805 | 7/1965 | Cholvin et al. | 60—13 X |
| 3,257,796 | 6/1966 | Updike | 60—13 |
| 3,386,427 | 6/1968 | Powell et al. | 123—119 CE |
| 3,389,553 | 6/1968 | Hardy et al. | 60—13 |
| 3,421,314 | 1/1969 | Michalke | 60—13 |

AL L. SMITH, Primary Examiner

U.S. Cl. X.R.

73—407; 92—36; 123—119 CE; 137—14